United States Patent [19]

Brown

[11] 4,002,102
[45] Jan. 11, 1977

[54] AUTOMATIC SETUP FOR MACHINING DEVICE

[75] Inventor: Trenton L. Brown, Bethel Park, Pa.
[73] Assignee: Aluminum Company of America, Pittsburgh, Pa.
[22] Filed: Nov. 20, 1975
[21] Appl. No.: 633,682
[52] U.S. Cl. .................................. 90/15 R; 82/3
[51] Int. Cl.² .................................. B23C 1/06
[58] Field of Search ........... 90/15 R, 11 R, 11 E, 90/DIG. 1, DIG. 2; 29/27 R, 27 C; 82/3, 34 A

[56] References Cited

UNITED STATES PATENTS

| 3,286,324 | 11/1966 | Hautau | 90/15 X |
| 3,722,334 | 3/1973 | Schubert | 82/34 A |

FOREIGN PATENTS OR APPLICATIONS

| 773,319 | 4/1957 | United Kingdom | 90/15 R |

Primary Examiner—Gil Weidenfeld
Attorney, Agent, or Firm—Elroy Strickland

[57] ABSTRACT

Apparatus and method for setting and machining the surface of at least one workpiece. The apparatus includes a structural member, means for supporting the structural member for transverse and longitudinal movement, and, a cutting device and a spacing block serially mounted on the structural member. The cutting device and the spacing block are disposed on the structural member such that the machining surface of the cutting device is located in a plane outside the plane of at least one side of the spacing block by a distance sufficient to remove a predetermined thickness of material from the workpiece.

10 Claims, 8 Drawing Figures

AUTOMATIC SETUP FOR MACHINING DEVICE

BACKGROUND OF THE INVENTION

The present invention relates generally to machining devices, and particularly to a simple method and apparatus for setting workpieces to be machined and then machining the workpieces in a consistent, accurate and economical manner.

In using mutually abutting surfaces of two workpieces, it is often necessary that the surfaces be clean, smooth and parallel to each other. In addition, in repetitive manufacturing processes requiring the machining of workpieces, the workpieces often will not be of consistent length so that the amount of material to be removed from each workpiece by the machining process will either differ or the workpiece or machining head must be adjusted to accommodate the differing workpiece lengths each time a workpiece is gripped for machining. Further, in gripping workpieces in clamping means, such as in the tapered jaws of chuck devices, the workpieces are drawn into the chuck by differing amounts (depending upon the size, temper and material of the workpieces) by the jaws of the chuck as the jaws tighten on the workpieces. This also tends to present different length portions of workpieces to the machining tool, again requiring individual adjustment of each workpiece before it is presented to the machining tool. Such adjustment procedures are costly in that they require substantial time and effort.

The problem of accurately preparing the mating surfaces of workpieces has generally involved machining processes in which each workpiece is separately machined in a lathe or a milling machine, for example. This, of course, requires that each workpiece be mounted, secured, machined, released and then removed from the lathe or milling machine before the workpieces are ever mounted in apparatus adapted to place them together. Such a process, again, involves a substantial amount of time, which time is translated into substantial dollar cost figures.

What is needed in the art of preparing workpiece surface to be used in abutting relation is an inexpensive device that will automatically, accurately set or position two workpieces for machining purposes after the workpieces have been secured in the clamping devices of apparatus employed to place the workpieces in abutting relationship, the automatic set being accomplished regardless of any differences that might exist in the lengths of the workpieces or of different length portions extending from the workpiece clamping devices.

BRIEF SUMMARY OF THE INVENTION

The present invention is directed to an apparatus supplying the above need, and supplying the need in a simple, economical manner. This is accomplished by an apparatus employing a single structural member mountable for transverse and longitudinal movement between opposed, workpiece holding devices, and supporting at least one cutting device and a spacing block serially located lengthwise of the structural member. To accurately place two workpieces in position for a machining operation, the workpieces are first secured in two clamping devices and the spacing block disposed between the workpieces. One of the clamping devices is then moved toward the other clamping device until the face or surface to be machined of the workpiece clamped in the moving clamping device engages one side of the spacing block. With the one workpiece engaging the spacing block, the workpiece and the block (with the structural support member) are then moved toward the other workpiece until the other side of the block engages the face or surface of the other workpiece to be machined. With the workpieces disposed and locked against the opposed sides of the spacing block, the structural member supporting the block is moved transversely of the workpieces such that the spacing block is removed from the space between the workpieces and the cutting device is moved into engagement with the faces of the workpieces to simultaneously machine the same in space vacated by the spacing block. With the workpieces so machined, and the cutter and block removed from the area between the workpieces, the workpieces are now ready to be placed together for their intended purposes. The above operation, using a single cutting device, such as a rotatable milling cutter, requires that the width or diameter of the cutting device be larger than the width of the spacing block by an amount sufficient to remove a predetermined amount of material from the workpieces.

THE DRAWINGS

The invention, along with its advantages and objectives, will be better understood from consideration of the following detailed description in conjunction with the accompanying drawings in which:

FIG. 4 is a view of the structure of FIG. 2 taken along lines IV—IV in said figure;

FIG. 5 is a view similar to that of FIG. 4 but showing two, non-rotatable cutting devices;

PREFERRED EMBODIMENTS OF THE INVENTION

Figure 1:
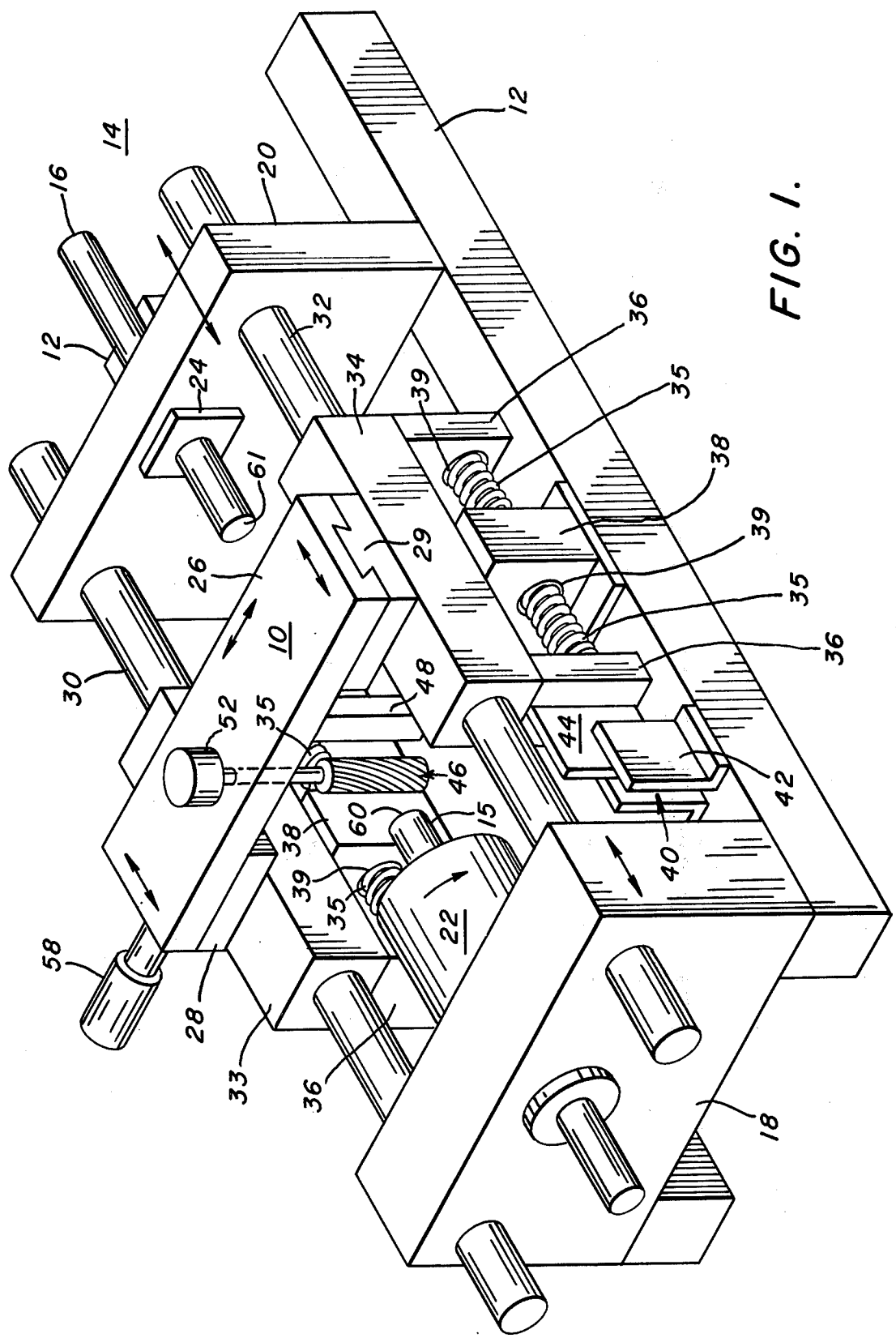
FIG. 1 is a perspective view of an embodiment of the invention suitable for use with workholding apparatus located in a generally horizontal position.
Figure 2:
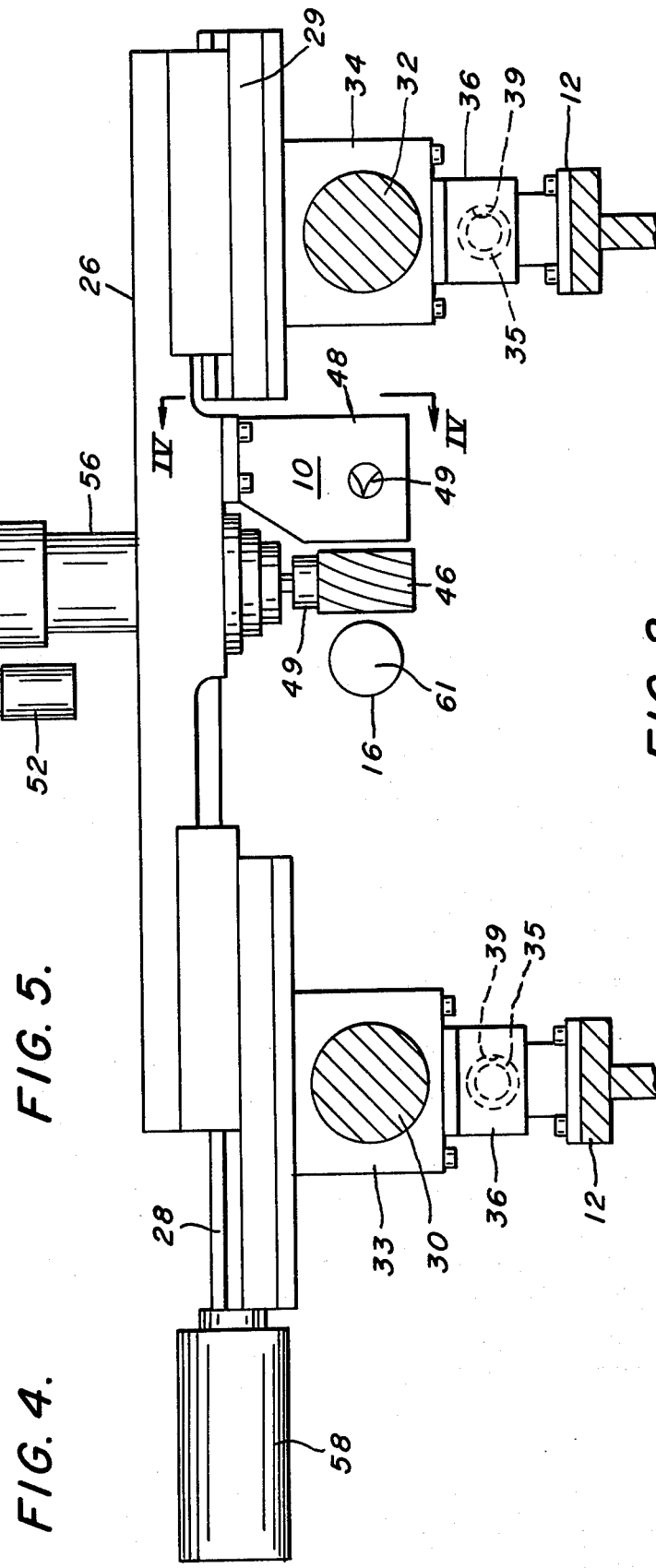
FIG. 2 is an end elevation view (with portions in section) of the embodiment and apparatus of FIG. 1.

Referring now to FIGS. 1 and 2 of the drawings, numeral 10 generally represents one embodiment of the workpiece setting and machining device or apparatus of the present invention. As depicted in FIGS. 1 and 2, the device is mounted on the horizontal bed 12 of an apparatus 14 (only partially shown) adapted to place workpieces 15 and 16 together at mating interfaces thereof. For purposes of this discussion, workpiece 15 is held in a longitudinally fixed headstock 18, and workpiece 16 is secured in a longitudinally movable tailstock 20 of apparatus 14. However, both the tail and headstocks may be movable lengthwise of bed 12.

As further indicated in FIG. 1, workpiece 15 is mounted in a rotatable chuck 22 while workpiece 16 is secured in a non-rotating chuck 24, these chucks being only diagrammatically depicted in FIG. 1. For purposes of the invention, however, the order of the rotatable and non-rotatable chucks may be reversed, neither of the chucks need be rotatable, or, both chucks may be rotatable.

The device 10 of the invention, as shown in FIGS. 1 and 2, comprises a horizontally disposed, structural beam member 26 located between work clamping devices 22 and 24, and extending crosswise of bed 12 of apparatus 14. The beam means is slidably mounted on two, transverse, horizontally disposed slides or guides 28 and 29, the beam and slides engaging each other along mating, bearing surfaces. The slides or guides, in turn, are respectively slidably mounted and retained on two, laterally spaced, tie bars 30 and 32, extending longitudinally between the head and tailstocks 18 and 20, by two elongated, depending portions 33 and 34 of the guides, the depending portions extending in the direction of the tie bars.

Immediately beneath each slide and tie bar are located two axially aligned springs 35 (FIGS. 1 to 3) held in place and alignment by longitudinally spaced, depending extensions 36 of structures 33 and 34, and an upstanding structure 38 (located centrally of extensions 36) shown attached to bed 12. Structures 36 and 38 each have indents or pockets 39 for receiving the opposed ends of the springs, as best seen in FIG. 3.

Figure 3:
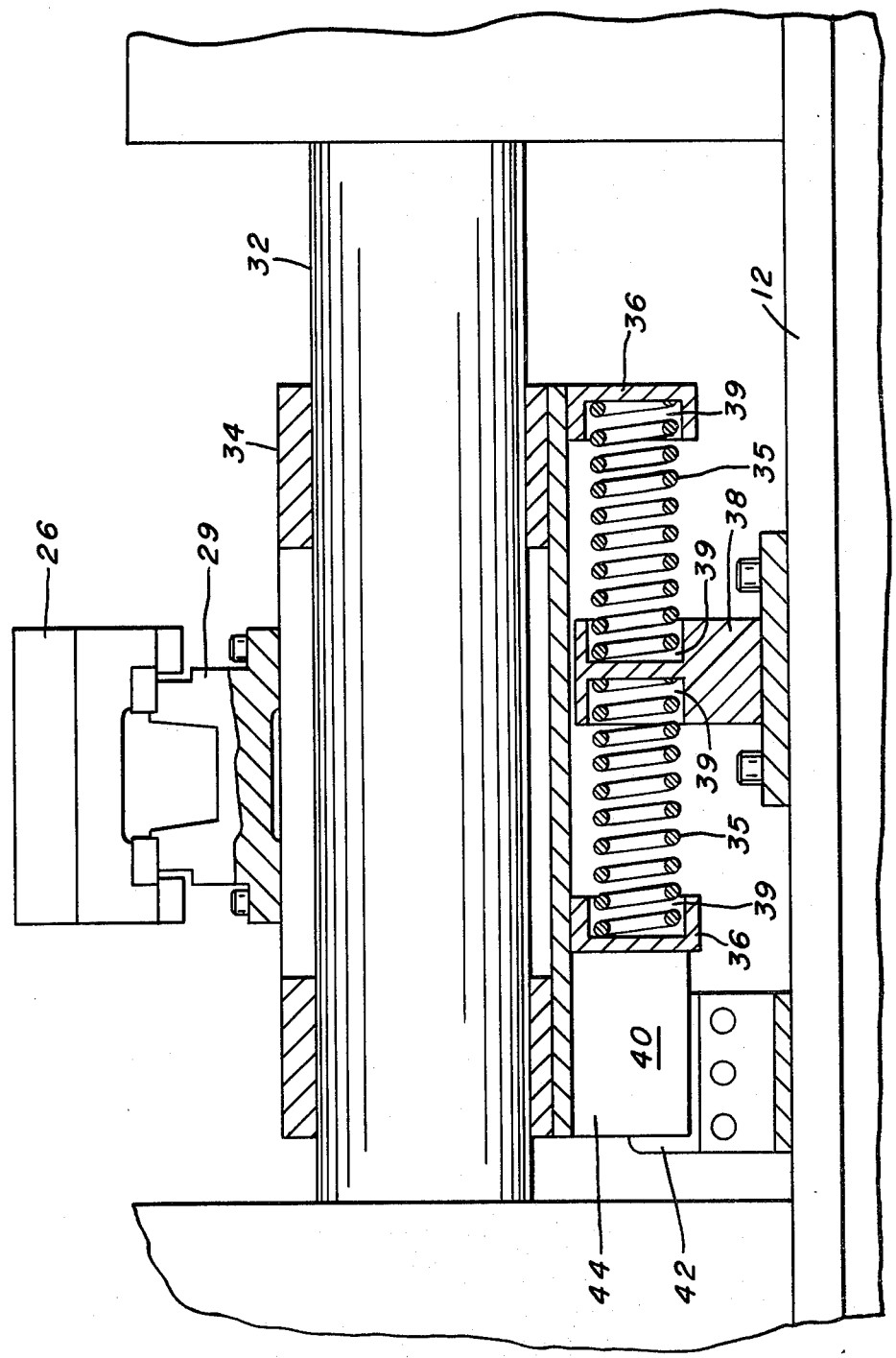
FIG. 3 is a partial side elevation of the structure of FIG. 1, showing particularly a brake and spring centering means of the invention.

As further shown in FIG. 3, a disc brake device 40 is located at one (lower left-hand) end of structure 34, with a similar brake (not shown) being located beneath structure 33. Each brake device comprises two caliper portions 42 (only one of which is visible in FIG. 3) attached to the bed 12 (on each side of apparatus 14) and located astraddle a plate 44 attached to underside of 33 and 34.

As best seen in the view of FIG. 2, a rotatable milling cutter 46 and a block means 48 are mounted on the underside of the beam structure 26, and at two, closely spaced, serial locations therealong, the cutter and block depending from the beam into an area between tie bars 30 and 32, and between the work clamping devices 22 and 24. The structure of device 10, as thus far described, is designed and dimensioned, when mounted on tie bars 30 and 32, to locate the cutter and block in substantial vertical alignment with the axes of the work clamping devices and thus on vertical center with the axes of the workpieces, such as 15 and 16, when 15 and 16 are secured in the clamping devices.

A depending, non-rotatable cutting device such as an ordinary lathe tool bit having a fixed cutting edge, can be fixed to the underside of beam 26 and in substantial longitudinal alignment with the rotatable cutter 46. The reason for two such different types of cutters is the need to machine two workpieces of dissimilar material. With the use of a fixed cutting edge, the workpiece is rotated against the cutting edge, using a main drive motor (not shown) of the apparatus, while the milling cutter mills the other workpiece.

However, instead of mounting a non-rotatable cutter directly to the underside of beam 26, a non-rotatable cutting device 49 is shown in FIG. 2 mounted in one side of block 48, with the cutting end and edge of the device extending slightly beyond the side of the block, as shown in FIG. 4. A hole 50 may be provided in the block, extending inwardly from the side of the block, to receive and secure the cutter therein, as indicated in dash outline in FIG. 4. Cutter 49 is located on vertical center with the ends of workpieces 15 and 16, but need not be located in the center of block 48, i.e., cutter 49 may be located anywhere on the block as long as the cutter is located on the center line of the workpiece to be machined thereby.

If neither of the materials of the workpieces requires a rotatable cutter, two non-rotatable cutters 49 may be used in the present invention, as shown, for example, in FIG. 5, with each cutter extending slightly beyond its associated side of block 48. The cutters may be a single, unitary device mounted in a hole 51 extending completely through the block, or, two cutters may be used, with each cutter mounted in its respective opening in the block, as suggested in dash outline in FIG. 5.

As seen in FIG. 4, if a single rotatable cutter (46) is employed to simultaneously machine two workpieces, the width or diameter of the cutter is slightly larger than the width of block 48 so that the cutting edge of the cutter lies outside the planes of the opposed sides of the block when the cutter and block are in substantial alignment. The amount that the cutting edge extends beyond the planes of the sides of block 48 depends upon the amount of material it is desired to remove from the workpieces (15 and 16), and is exaggerated in FIGS. 4 and 5 for purposes of illustration. If the rotatable cutter is employed to machine only one workpiece at a time, the cutting edge of the cutter need only extend beyond the side of the block facing the workpiece to be machined.

For the same reason, if a non-rotatable cutting device, such as 49 (FIGS. 2 and 4) is used, the cutting edge of the device lies in a plane slightly outside of and parallel to the plane of the corresponding side of the block. If two non-rotatable cutters are used, both cutters would be disposed such that their fixed cutting edges (FIG. 5) would be slightly outside the planes of the sides of block 48.

To rotate the milling cutter 46 shown in FIGS. 1, 2 and 4, a motor 52 is mounted on beam member 26 and suitably geared or otherwise mechanically connected to drive the cutter at a proper rotational speed. In the structure depicted in FIGS. 1 and 2, housing 54 houses a gear reduction means (not visible) which connects motor 52 to the cutter via a spindle (not visible) located within a vertically disposed housing 56 extending between the gear housing and the beam member.

A second motor 58 is shown mounted on the left-hand end of support slide 28 (in FIGS. 1 and 2) for the purpose of translating beam member 26 along slides 28 and 29 and hence transverse of the longitudinal extent of apparatus 14. Any suitable means, such as a rack an pinion or mechanical screw, can be used to connect the motor to the beam for the purpose of propelling the same crosswise apparatus 14.

In using the apparatus of the invention in combination with the horizontal bed structure shown in FIGS. 1 and 2, the workpieces (15 and 16) to be faced or machined are disposed and secured in the clamps or chucks 22 and 24 of head and tailstocks 18 and 20 of the structure. This locates the axes of the workpieces in axial alignment with each other and places end or exposed faces 60 and 61 of the respective workpieces facing in the direction of each other on the opposed sides of setting and cutting apparatus 10. Beam member 26 is now transversely positioned to place spacing block 48 (depending from beam 26) on substantial axial center with the workpieces.

To set the workpieces for machining, the head and tailstocks must be brought to the sides of spacing block 48. If the headstock 18 is longitudinally fixed on bed 12, the tailstock is moved longitudinally toward the spacing block to place the exposed end or face 61 of workpiece 16 in abutting engagement with the side of th block facing workpiece 16. The longitudinal movement of the tailstock is continued toward the headstock, with workpiece 16 moving apparatus 10 toward the headstock along tie bars 30 and 32 until block 48 engages the exposed end or face 60 of workpiece 15. When this occurs, brake means 40 is energized to hold apparatus 10 in place (via calipers 42 engaging plate 44) against the faces of the workpieces and against the force of springs 35. (The tailstock is held in place by its own mass and/or source of motive power not shown.) The workpieces are now spaced apart a distance equal to the width of block 48.

With the faces of the workpieces engaging the sides of block 48, motor 58 is energized to translate beam 26 transversely of the workpieces, which removes the block from between the opposed faces 60 and 61 of the workpieces while simultaneously moving milling cutter 46 toward the opposed faces, as the cutter follows the block. With the use of milling cutter 46, motor 52 is energized before the cutter is moved into engagement with the workpieces so that upon such engagement the cutter is rotating at a proper cutting speed. These functions can be ordered by an operator at a control panel, using appropriate control devices, or, the operation, as thus far described, can be fully automated. In any case, as beam 26 moves crosswise the workpieces, cutter 46 is moved into simultaneous cutting engagement with the ends of the workpieces (if cutter 46 is the only cutting device used) to simultaneously remove material from the workpiece ends, the block 48 having properly and accurately set the workpieces for the cutting or machining process. The beam continues to traverse the area of the workpieces which carries the cutter across the ends of the workpieces in the material removing process. As explained earlier, the amount of material removed is predetermined by the amount the periphery of cutter 46, or the cutting edge of fixed cutter 49, extends beyond the planes of the opposed, workpiece abutting sides of block 48. In addition, as mentioned above, the workpiece being faced by a fixed cutting edge needs to be rotated to effect machining of the workpiece surface.

With the rotatable and fixed cutters 46 and 49 being serially spaced apart lengthwise of supporting beam 26 in the manner shown in FIG. 2, the cutting effected by the two cutters is not simultaneous. If the exposed end of the fixed cutter, for example, extends into a depression or opening provided in the center of the face of the workpiece having an annular surface or face to be machined, when the workpieces are set and spaced by block 48, the fixed cutter is the first cutter to engage and remove workpiece material, i.e., material from the annular face, as the cutter is translated thereacross by transverse movement of beam 26. Thereafter, the milling cutter engages the face of the other workpiece to mill the same as beam 26 continues its traversal of the workpieces and associated apparatus.

When the beam 26 completes its travel crosswise of the workpieces such that the cutter or cutters have completed machining the ends of the workpieces, tailstock 20 is moved away from machining apparatus 10, and brake 40 released, which allows springs 35 to return the apparatus to an intermediate, at-rest location longitudinally spaced from the workpieces and head and tailstocks. The space between the workpieces is also clear of the cutter and spacing block, as shown in FIG. 2, so that the space between the ends of the workpiece can be closed to place the ends together in the process effected by apparatus 14. After the process is completed, the workpieces are removed from their respective clamps, and another set of workpieces secured respectively therein for a repeat of the above operation.

With the apparatus of the present invention, one workpiece can be faced, though the simultaneous facing of two workpieces is highly advantageous since twice the amount of work is accomplished with only one traversal of the spacing block and cutter.

Figure 6:
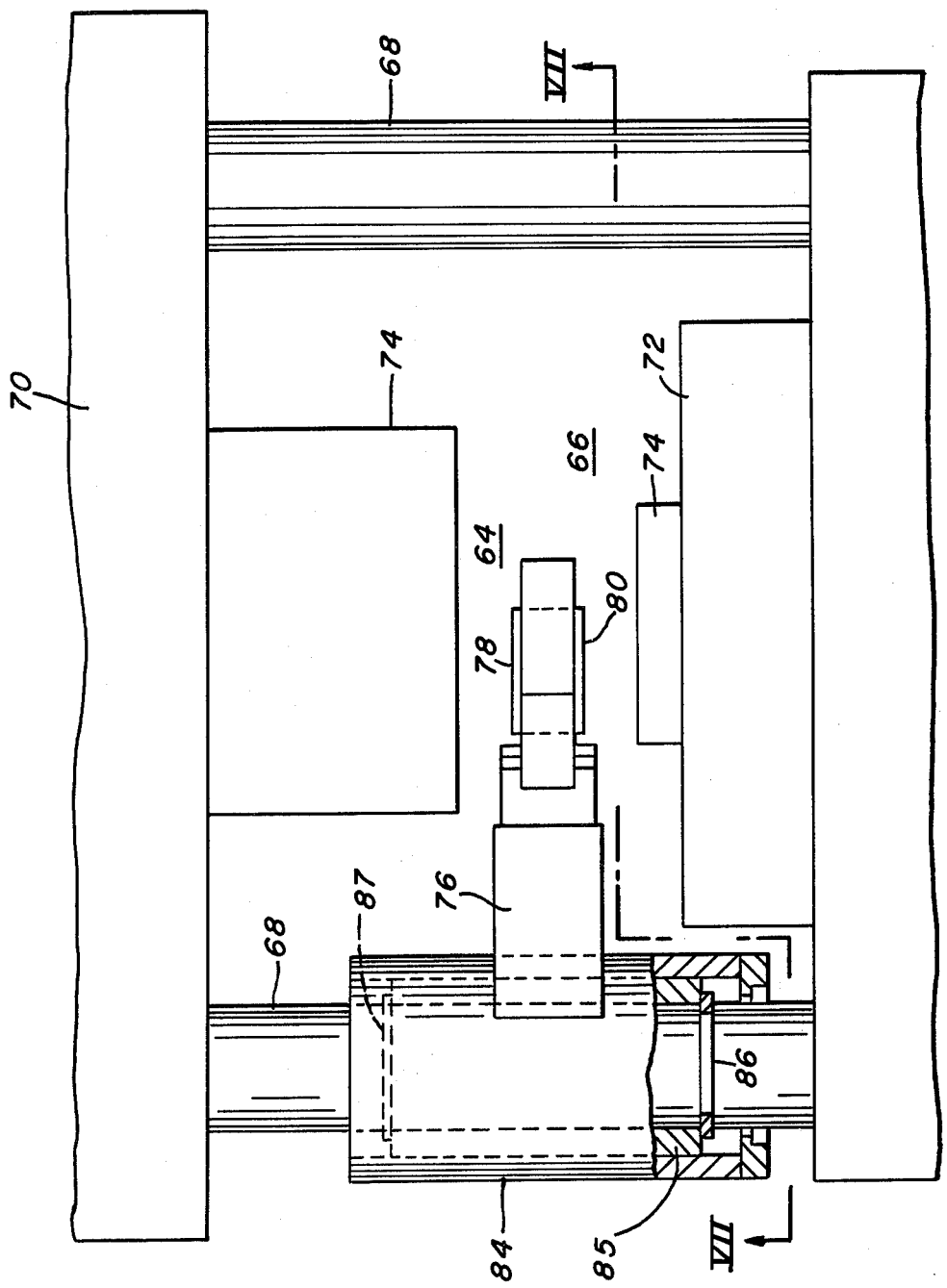
FIG. 6 is an elevation or plan view of yet another embodiment of the invention.
Figure 7:
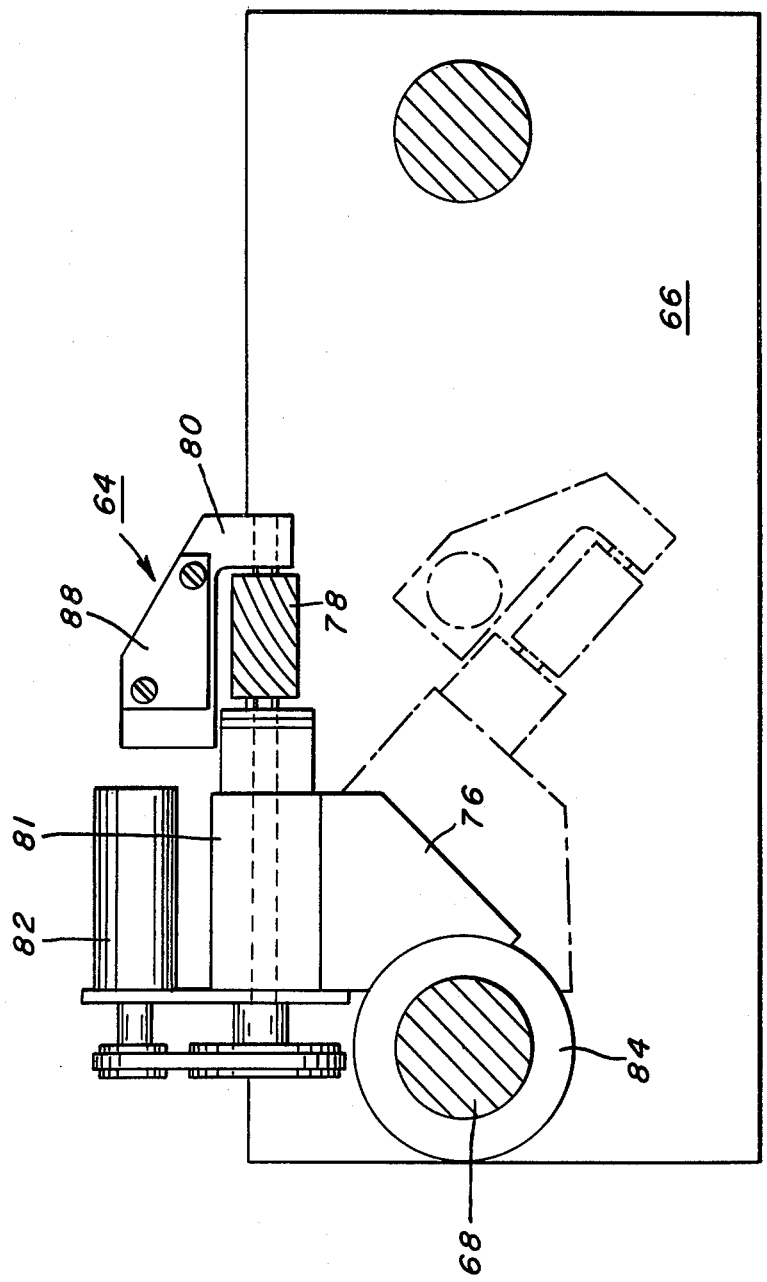
FIG. 7 is a view of the embodiment of FIG. 6 taken along lines VII—VII of FIG. 6.

FIGS. 6 and 7 of the drawings show a setting and cutting device 64 of the invention mounted in combination with a machine 66 that might be disposed in either a vertical or horizontal position. More particularly, machine 66 is shown comprising two, spaced apart, posts or tie bars 68 supporting an overhead tailstock 70 and a lower headstock 72, if the machine is vertically disposed. Like the horizontal apparatus 14 of FIGS. 1 to 3, the tail and headstocks 70 and 72 have clamping means 74 for securing workpieces (not shown) in the tail and headstocks.

Setting and cutting device 64 comprises a structural member 76 supporting a rotatable milling cutter 78 and a spacing block 80, the cutter and block being shown in substantial alignment for serial disposition and rotation into and out of the area between clamping means 74 of head and tailstocks 70 and 72. In a horizontal machine, the cutter and block would rotate in a vertical plane in being translated into and from the area between the workpiece ends. In an upstanding, vertical machine, the cutter and block would rotate in a horizontal plane.

Preferably, as best seen in the plane view of FIG. 7, spacing block 80 is an L-shaped structure attached to a hollow structure 81 housing a spindle (not visible) connected between cutter 78 and means, such as a belt and pulley arrangement, connecting a motor 82 to the spindle. The L-shaped block structure permits both ends of the cutter to be held in proper alignment to insure reliable operation of the cutter, when the cutter is rotated by motor 82, while simultaneously serving as a spacing member in the manner described above in connection with block 48.

In FIGS. 6 and 7, structural support member 76 is shown attached to a hydraulic or air operated cylinder 84 rotatably disposed on left-hand post 68 of apparatus 66, as viewed in FIGS. 6 and 7, the cylinder containing a sleeve 85 disposed around left-hand post 68, and longitudinally fixed thereon by ledge means 86 and 87 provided on the post. When fluid is directed into either of the ends of the cylinder, the cylinder is moved along the post on sleeve 85 in a direction toward the end receiving the fluid.

To swing or rotate the cutter and block into place between clamps 74 of apparatus 66, support member 76 and cylinder 84 can be rotated by a suitable mechanism, such as the actuating cylinder 96 described below in connection with the embodiment shown in FIG. 8, through other actuating means may be used.

The operation of the arrangement of FIGS. 6 and 7 is similar to that of FIGS. 1 to 5 described above. After two workpieces (not shown) are clamped in clamps 74 of apparatus 66, support member 76 is rotated into a position that places block 80 into axial alignment with exposed ends of the workpieces. The tail or headstock 70 or 72 of 66 is now moved toward the block along posts 68 until the exposed end of the workpiece clamped in the tail or headstock engages the one side of block 80. The tail or headstock continues to be moved along posts 68 until the other side of block 80 engages the end of the other workpiece, cylinder 84 being relieved of pressure to allow it to move along its supporting post. With the workpieces engaging the sides of the block, pressure is now applied to cylinder 84 to maintain the verticle or horizontal position of support member 76 while support member 76 is rotated to move block 80 from the space between the ends of the workpieces and to move cutter 78 against the workpiece ends and into said space to mill the workpiece ends, the cutter being rotated at a suitable machining speed by motor 82. The diameter of the cutter is larger than the width of block 80 by the amount of material it is desired to remove from the ends of the workpieces. If it is desired to increase the width of the spacing block, shims can be suitably attached to one or both sides of the block, such as shim 88 being shown in FIG. 7.

After the machining operation is completed, as just described, cylinder 84 is operated to return support member 76 to a longitudinally central location between the tail and headstocks of apparatus 66. Further, the block and cutter are not rotated out of the area between the tail and headstock so that the workpieces can be brought together at their machined ends to effect the process to be performed by apparatus 66.

In the above description of the apparatus of FIGS. 6 and 7, only a single milling cutter 78 is described. However, as discussed earlier in connection with the apparatus of FIGS. 1 to 5, a fixed blade cutting device can be used in combination with the milling cutter or in place thereof.

Figure 8:
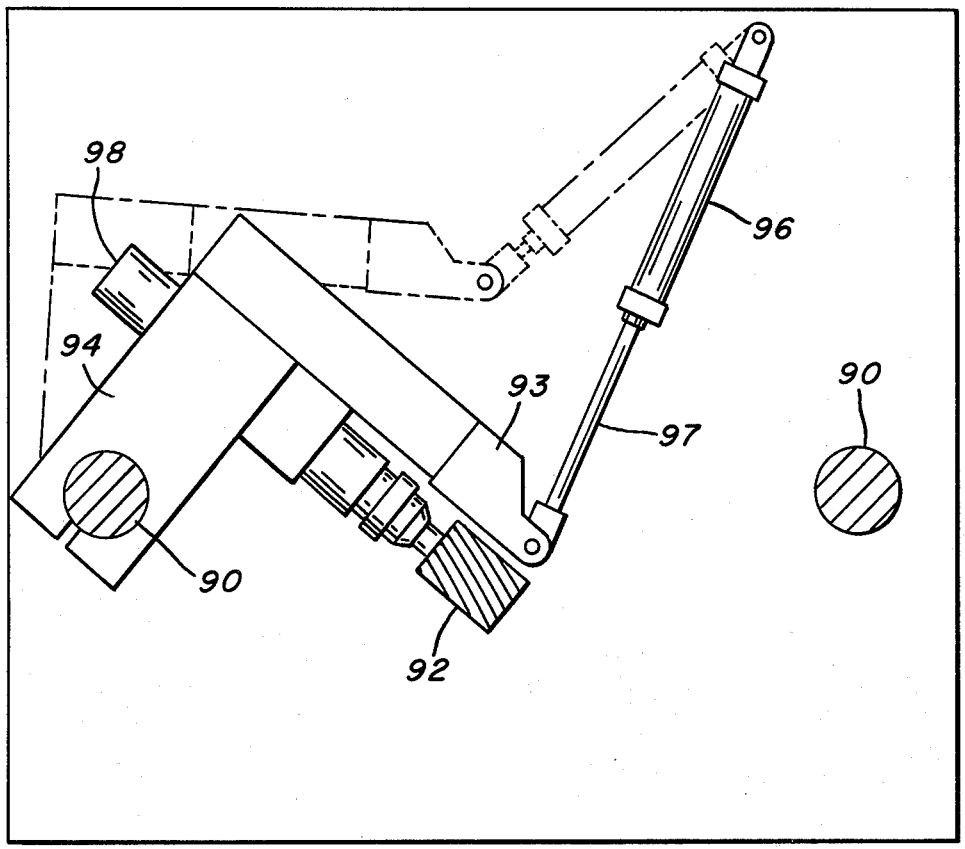
FIG. 8 is a plan view of an actuating mechanism for a vertical embodiment of the invention.

FIG. 8 of the drawings shows a setting and cutting device and arrangement of the invention that is particularly suitable for a vertically disposed machine, the machine having two, vertically extending, spaced apart posts or columns 90. Like the arrangement depicted in FIGS. 6 and 7, a cutting device 92 and a spacing block 93 are supported on structural member 94, which, in turn, is swingably mounted on the left-hand post (in the view of FIG. 8) of posts 90. To rotate the structural member, and thus the cutter and block, into place between two workpieces (not shown) supported by the machine of columns 90, an air or hydraulically operated cylinder 96 is employed, with the arm 97 of the cylinder being pivotally connected to block 93, while the cylinder itself is swingably attached to the vertical machine at a suitable, fixed location.

The operation of the device of FIG. 8 is similar to that described above in connection with the previous embodiments, the cylinder 96 being effective to rotate block 93 into place for the workpiece setting operation, and then operational to move cutter 92 into place for the machining process, with the actuation of cutting motor 98. As in the case of the non-rotatable cutting means shown in FIGS. 2, 4 and 5, the arrangement of FIG. 8 can include and utilize such cutting means.

After the above setting and cutting process, cylinder 96 locates support member 94 (with the cutter and block) in an at-rest position out of the way of the workpieces so that the machined faces thereof can be brought together.

While the invention has been described in terms of preferred embodiments, the claims appended hereto are intended to encompass all embodiments which fall within the spirit of the invention.

Having thus described my invention and certain embodiments thereof, I claim:

1. Apparatus for relatively positioning the cutting edge of a machine tool and the surface of a workpiece to be machined by said tool, the apparatus comprising means for mounting the workpiece,
    a structural member supported for transverse movement with respect to the mounting means and the surface of the workpiece to be machined,
    a tool having at least one cutting edge for machining the surface of the workpiece,
    means having a surface for locating the surface of the workpiece relative to the cutting edge of said tool in a relationship in which the cutting edge of said tool lies outside of and parallel to the surface of said locating means, said tool and locating means being serially located on said structural member,
    means adapted to place the surface of the workpiece to be machined and the surface of said locating means in mutual engagement with each other, and
    means for moving the structural member relative to and in a direction transverse of the surface to be machined such that the locating means can be moved from the surface to be machined and the machining tool can be moved into cutting engagement with the surface to be machined.

2. The apparatus of claim 1 in which the machining tool is a rotatable milling cutter.

3. The apparatus of claim 1 in which the machining tool is a non-rotating device having a fixed cutting edge.

4. The apparatus of claim 2 including a motor mounted on the structural member for rotating the milling cutter.

5. The structure of claim 1 including at least two, laterally spaced bars, means supporting the structural member on said bars, said structural member being slidably movable on said supporting means.

6. The apparatus of claim 5 in which the supporting means is slidably mounted on the spaced bars.

7. The apparatus of claim 5 including a motor for propelling the structural member on the means slidably supporting the same.

8. The apparatus according to claim 5 including resilient means for longitudinally locating the structural member and supporting means on the spaced bars at an at-rest position therealong.

9. The apparatus of claim 8 including brake means for holding the structural member at a location lengthwise of the spaced bars against the force of the resilient means.

10. The apparatus of claim 2 in which the locating means has opposed, parallel sides, with the diameter of the milling cutter being slightly larger than the distance separating the parallel sides, the cutter and locating means being positioned on the transverse structural member such that the periphery of the cutter lies outside the planes of the parallel sides of the locating means.

* * * * *